United States Patent [19]

Iacovazzi et al.

[11] 3,874,866

[45] Apr. 1, 1975

[54] GLASS FEEDER TUBE OPERATING MECHANISM

[75] Inventors: Michael A. Iacovazzi, Bristol; Aldo Basile, West Hartford, both of Conn.

[73] Assignee: Emhart Corporation, Bloomfield, Conn.

[22] Filed: Apr. 8, 1974

[21] Appl. No.: 458,812

Related U.S. Application Data

[63] Continuation of Ser. No. 351,763, April 16, 1973, abandoned.

[52] U.S. Cl. .................................. 65/164, 65/330
[51] Int. Cl. .................................. C03b 5/26
[58] Field of Search .................. 65/164, 330, 207

[56] References Cited
UNITED STATES PATENTS

| | | | |
|---|---|---|---|
| 2,306,789 | 12/1942 | McNamara | 65/164 X |
| 2,470,558 | 5/1949 | Honiss | 65/330 X |
| 2,479,121 | 8/1949 | Koleda | 65/330 |
| 2,950,571 | 8/1960 | Wythe | 65/164 |

*Primary Examiner*—S. Leon Bashore
*Assistant Examiner*—Frank W. Miga
*Attorney, Agent, or Firm*—McCormick, Paulding & Huber

[57] ABSTRACT

The refractory tube, which controls the flow of glass from the feeder bowl, is rotatably supported on a horizontal cross arm, and a drive motor is mounted on the arm for rotating the tube. The cross arm is mounted to a tubular rod, preferably at the balancing point of the combination of the refractory tube, the drive motor, and the cross arm. Thus, the weight of these various elements can be conveniently counteracted by a tension spring, one end of which is connected to a fixed support structure, and the other of which is connected to the tubular support rod. The tubular support rod is in turn slidably supported in vertically spaced bearings provided for this purpose in a C-shaped frame. A threaded shaft extends upwardly into the lower end of the support rod and engages an internal nut for raising and lowering the rod to vary the height of the refractory tube above an annular curb defined in the feed bowl. A stepping motor is adapted to rotate the threaded shaft through incremental angular displacements, and a control circuit is provided to operate the stepping motor, said circuit including increase and decrease gob weight switches which must be operated in conjunction with an incremental advance switch in order to vary the height of the rotating tube above the curb.

12 Claims, 3 Drawing Figures

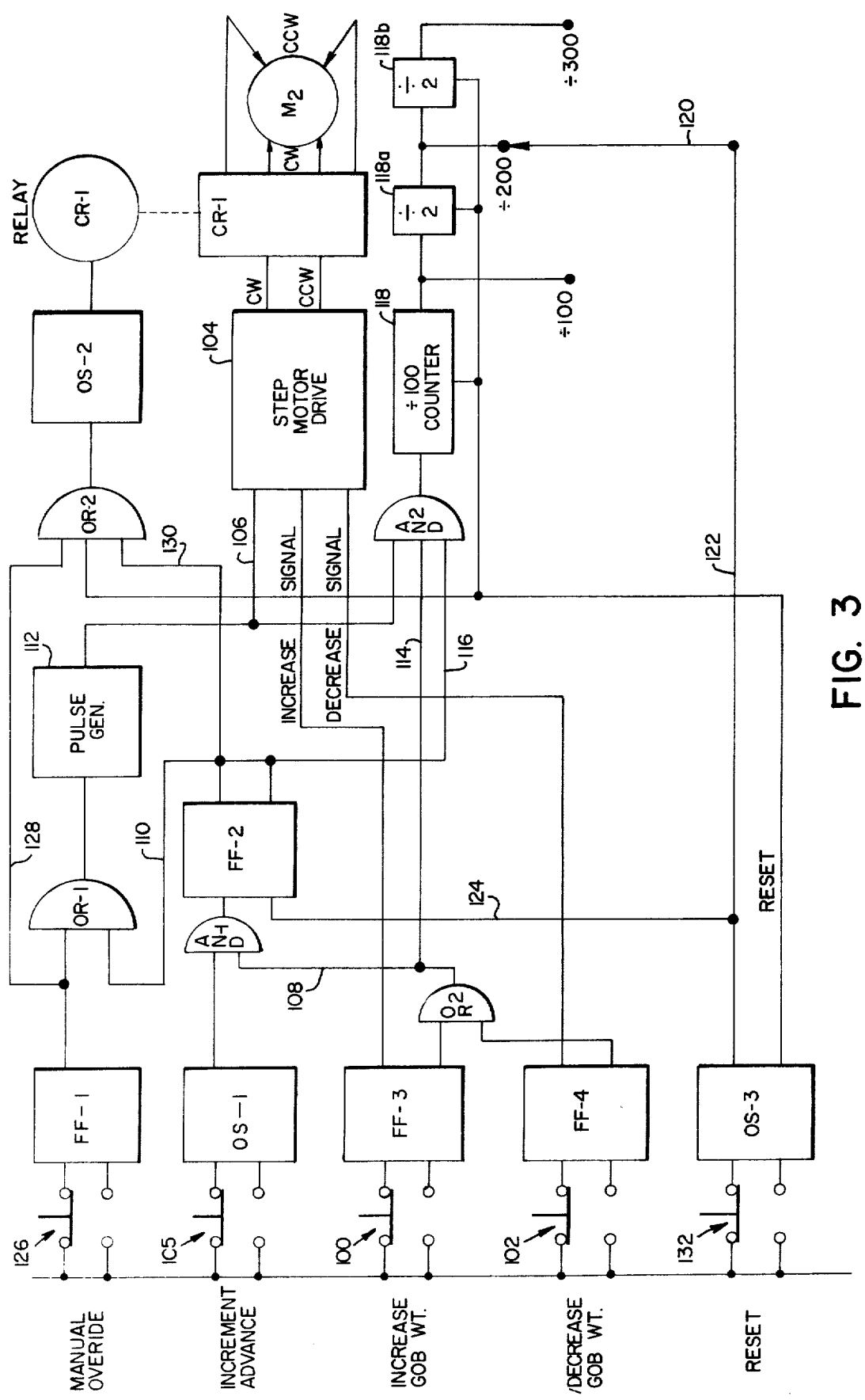

3,874,866

GLASS FEEDER TUBE OPERATING MECHANISM

This is a continuation of application Ser. No. 351,763, filed Apr. 16, 1973, now abandoned.

BACKGROUND OF THE INVENTION

This invention relates generally to the glass feeder art, particularly that branch of such art dealing with the forming of discrete gobs of molten glass for the purpose of forming glassware articles or the like.

In a typical glass feeder apparatus molten glass is provided in a feeder bowl which includes an outlet spout defined in part by an annular curb over which the molten glass is adapted to flow in response to vertical reciprocating motion of a refractory plunger. A rotatable tube, also of refractory material, is provided coaxially with respect to the plunger, and has its lower end spaced above the annular curb at a height which determines the rate of molten glass flow from the feeder bowl. The use of such a revolving tube is shown for example in U.S. Pat. No. 1,760,254 issued May 27, 1930 to Peiler. The use of such a revolving tube tends to break up cordy conditions which may exist in the glass. The tube tends to stretch these cords into the body of the glass so that these cords have very little detrimental effect on the glassware formed in the machine mentioned above.

The revolving refractory tube is used primarily for control of the weight of the gob of glass formed at the outlet spout of the feeder bowl, and slight fluctuations in weight of the gobs so formed are best corrected by raising or lowering the tube. A method and means for automatically regulating the weight of such articles in a glassware forming machine is shown and described in pending patent application Ser. No. 275,364 filed July 26, 1972 in the name of Foster and Jaeger. However, this pending patent application relates to weighing of the glassware articles formed in the machine, and controlling the height of the tube in the feeder bowl in response to the output of a weigh cell. A controller is shown and described in said application which is programmed to vary the position of the tube in the feeder bowl when the weigh cell output exceeds predetermined limits.

The present disclosure relates to a control circuit not only for making fine adjustments to the revolving tube height but also for setting the tube at a predetermined height when the feeder apparatus is started up after having been shut down, and after the molten glass has cooled to the point where glass viscosity will not permit proper forming of the gob at the outlet spout of the feeder bowl. For example, when the glassware machine and feeder apparatus are shut down for any reason it is common practice for the revolving tube to be lowered against the curb so as to interrupt the flow of glass from the feeder bowl. Thus, when the apparatus is to be restarted, the molten glass must be sufficiently soft so as to again flow through the passageway defined by the lower end of the tube and the annular curb defined in the feeder bowl. In order to set the machine up for this operation the present invention will permit the operator to introduce a signal to the control circuitry to be described which signal will be stored mechanically in the apparatus itself so that when the desired degree of viscosity is reached in the glass the tube will then rise to the proper level or can be adjusted to the proper level in a more expeditious manner than has been possible heretofore.

As a result of the rather large weights involved in the refractory tube together with its associated drive motor for rotating the tube, the loads on the mechanism for adjusting the height of the tube in the feeder bowl have been subjected to excessive wear. This wear has resulted in rather significant problems from the point of view of backlash in the gearing used to adjust the height of the tube in the feeder bowl. For example, U.S. Pat. No. 2,479,121 issued to Koleda Aug. 16, 1949 shows and describes a particular mechanism for compensating for the wear on the relatively moving threads of the adjusting screw and nut of the mechanism disclosed in the above mentioned Peiler U.S. Pat. No. 1,760,524. As pointed out in the Koleda U.S. Pat. No. 2,479,121 operators of apparatus such as that described herein are accustomed to use the feeder tube position adjustment to secure and maintain proper weight of the charges or gobs produced by the feeder. Therefore, it is important that the mechanism used to effect such adjustment have a high degree of repeatability and that it act instantly to effect the adjustment desired. In the Koleda patent a supplemental button the adjusting screw between the main nut and the compression coil spring used in that mechanism provided for relative axial movement between the main nut and the supplemental nut to obviate any backlash of lost motion due to wear of the coengaging threads. In the present invention no such supplemental nut is required, and the backlash due to wear of the moving threads of the present disclosure is eliminated or reduced at its source by providing a tension spring so arranged as to reduce the gravity load on these threads.

SUMMARY OF THE INVENTION

The present invention resides in the environment of a molten glass feeder apparatus for forming gobs of molten glass for delivery to a glassware forming machine. Such an apparatus includes a feeder bowl with a lower outlet spout defined in part by an annular curb over which the molten glass is adapted to flow in response to vertical reciprocating motion of a refractory plunger. A refractory tube is arranged to rotate coaxially with respect to the plunger, and its lower end is spaced above the annular curb at a height, H, which defines an annular passageway for the glass. Novel support means is provided for the rotating tube, and includes a cross arm upon which the rotating refractory tube and its drive motor are balanced at a point where the cross arm is joined to a tubular support rod. The support rod is vertically oriented and slidably received in vertically spaced bearings provided in a C-shaped frame which also rotatably supports a threaded shaft connected to the rod through a captive nut in the lower end of the rod. The combined weight of the cross arm and the refractory tube and motor are reacted through the rod and threaded shaft by the C-shaped frame. A tension spring may be provided in a tubular housing at the upper end of the C-shaped frame for acting between the upper end of the support rod and said housing to reduce the weight forces reacted through the threaded shaft and nut. An electric stepping motor is provided for rotating the threaded shaft and thereby varying the height of the refractory tube above the annular curb, and the electric stepping motor is controlled by a solid state control circuit which includes increase and decrease gob weight push button switches, as well as an incremental advance push button switch, which latter switch must be closed together with one of the gob weight change switches to achieve an incremental change in the height of the refractory tube above the annular curb. Because of the hostile environment for the solid state devices included in the stepping motor control circuit, caused in part by the heat of the molten glass being handled in the feeder apparatus, a timing device is provided in the stepping motor control circuit to limit the operation of the stepping motor and to thereby increase the reliability of the solid state components.

BRIEF DESCRIPTION OF THE DRAWINGS

FIG. 3 is a schematic view of the control circuitry for operating the stepping motor.

DETAILED DESCRIPTION

Figure 1:
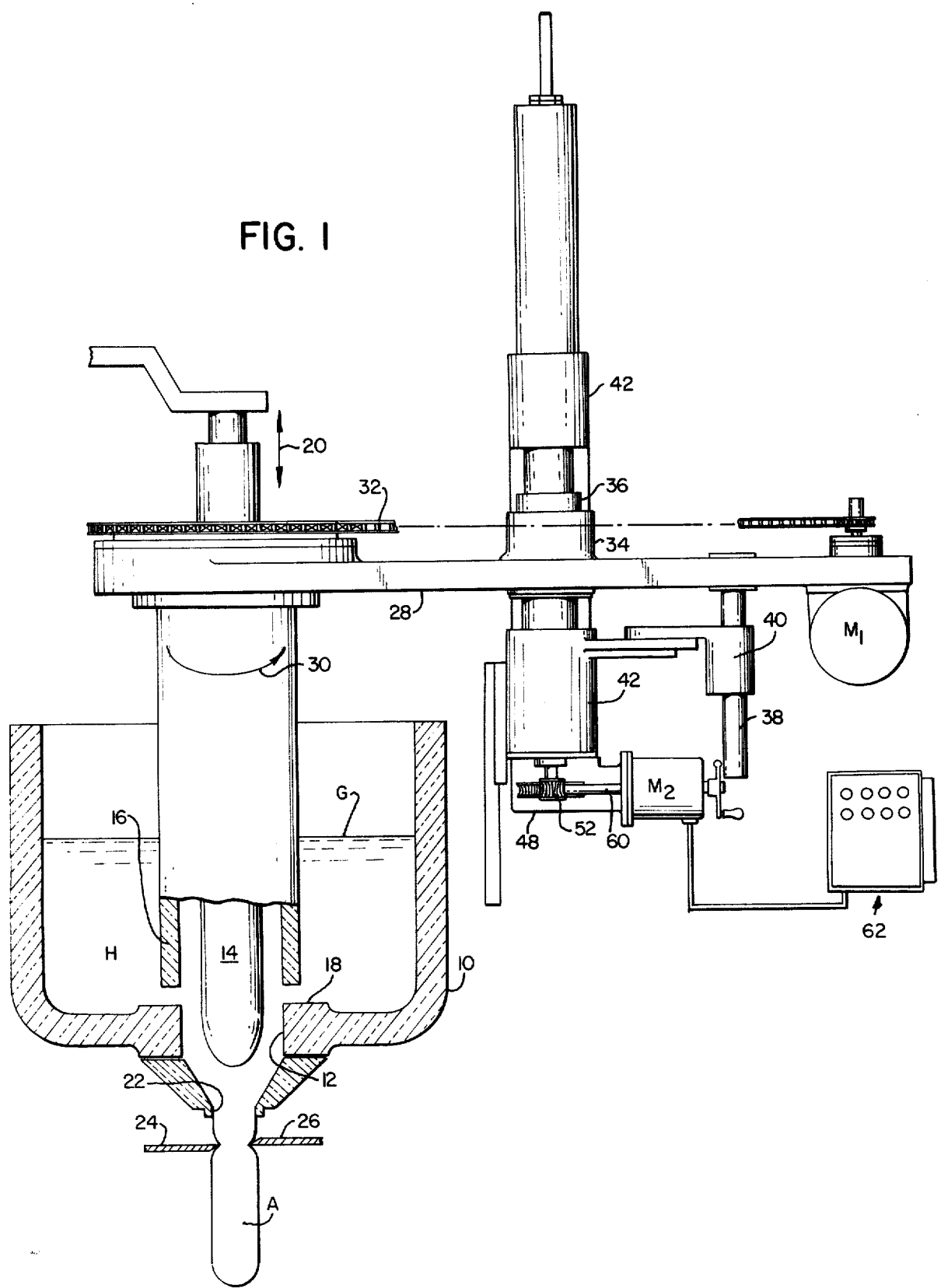
FIG. 1 is an overall view of a feeder apparatus incorporating the present invention.

Turning now to the drawings in greater detail, FIG. 1 shows a feeder bowl 10 of the type which is adapted to be provided at the downstream end of the forehearth furnace to receive a supply of molten glass G, which glass will preferably be at a predetermined level in said feeder bowl, and also be at a predetermined temperature so as to assure that the flow of molten glass through the outlet spout 12 of the feeder bowl be maintained at a constant level dictated by the reciprocable motion of the refractory plunger 14. However, this ideal situation is not always readily obtainable, and the present invention relates to an improved mechanism for controlling the vertical height of the refractory tube 16 above an annular curb 18 defined in the feeder bowl so as to vary the size of an annular passageway defined therebetween.

The refractory plunger 14 is reciprocated in response to conventional means (not shown) but as indicated schematically by the double ended arrow 20 in FIG. 1. As is well known reciprocable motion of the plunger 14 will cause molten glass to emanate from the orifice 22 defined in the outlet spout area of the feeder bowl, and reciprocating shear blades 24, 26 are provided to assist in the forming of gobs of glass at the outlet spout, as indicated generally by the partially formed gob or charge A in FIG. 1. Conventional means is provided for conveying these gobs of glass to the various sections of a typical glassware forming machine, and the significant feature of the present invention is to provide for a weight of these gobs which is adjustable by varying the height H of the revolving refractory tube 16 above its associated curb 18 in the feeder bowl 10.

The refractory tube 16 is of conventional construction, being mounted to a cross arm 28 and being adapted for rotation in the direction of the arrow 30 through a chain drive, indicated generally at 32, as a result of continuous rotation of a drive motor $M_1$ provided for this purpose at the opposite end of the cross arm 28. As so constructed and arranged the weight of the drive motor $M_1$ will tend to counteract the weight of the refractory tube 16 so that the combined weight of these elements in conjunction with that of the cross arm 28 tends to balance in the area of the cylindrical boss 34 which supports the cross arm from a tubular support rod structure to be described. The boss 34 preferably houses an eccentric bushing 36 which will permit the horizontal position of the cross arm 28 to be varied within predetermined limits with respect to the longitudinal axis of the tubular support rod structure. In order to prevent rotation of the cross arm 28 on this tubular support rod structure a depending post 38 is provided on the cross arm and is slidably received in a housing 40 provided for this purpose in the fixed frame structure to be described.

Figure 2:
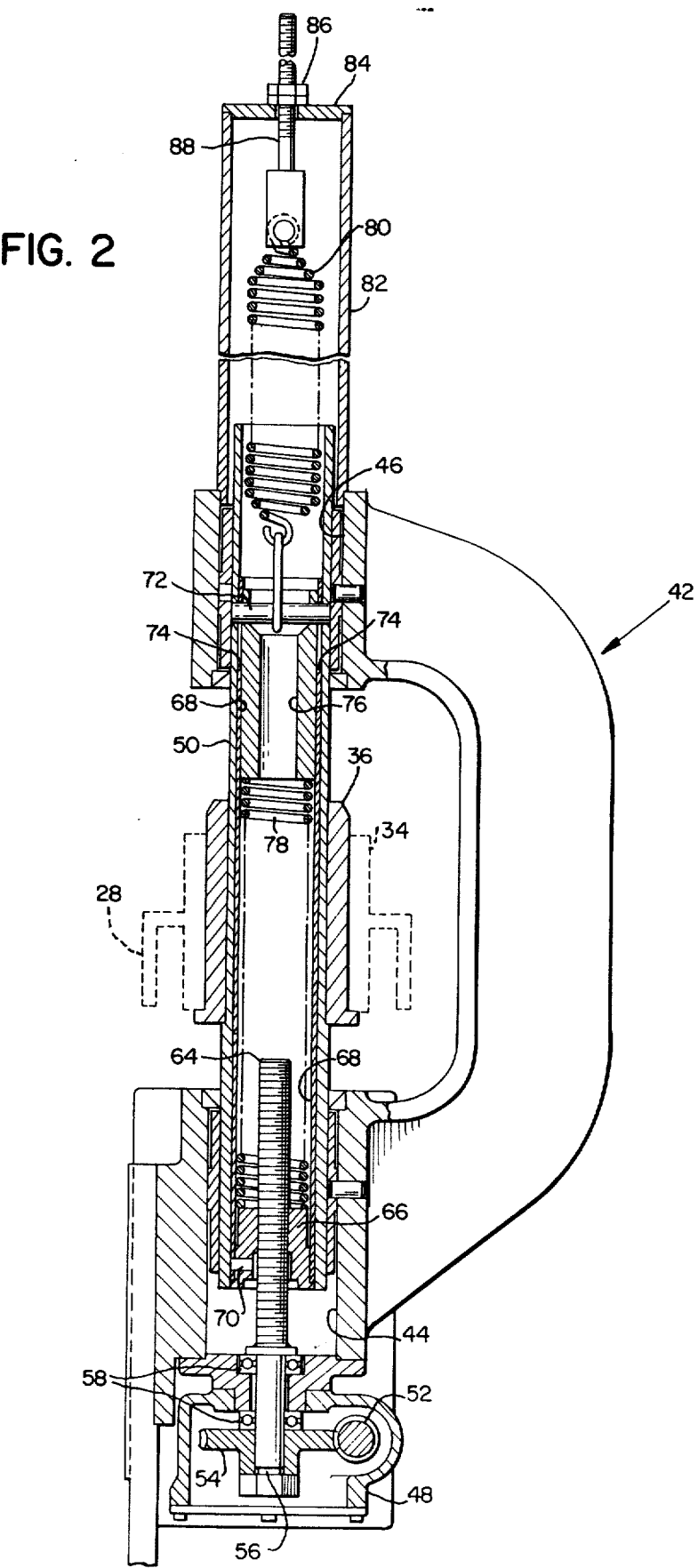
FIG. 2 is a vertical sectional view showing the details of the tubular support rod and also the C-shaped frame which carries the spaced bearings for said rod.

Turning now to FIG. 2 in greater detail, the fixed frame for the support rod structure which carries the cross arm 28 will be seen to comprise a generally C-shaped casting 42, the lower end of which casting is mounted to fixed structure and defines a slide bearing 44. A second slide bearing 46 is provided in vertically spaced relationship in the C-shaped frame 42 above the lower bearing 44 and cooperates therewith to define a guideway for slidably receiving the tubular support rod 50. Still with reference to the fixed frame 42, its lowermost end carries a gear box housing 48 which includes a worm gear 52 and a matching pinion 54, said pinion being carried on a vertically oriented shaft 56, which shaft is rotatably supported in the gear box housing at the lower end of the C-shaped frame as indicated generally by the bearings 58, 58. The worm gear 52 is carried on a shaft 60 associated with a stepping motor $M_2$ best shown in FIG. 1. The stepping motor $M_2$ may comprise any one of several well known brands, such as the model M111-FD12 made by Superior Electric Company of Bristol, Connecticut. Such a motor is adapted to complete 1 revolution per second in response to a pulse train of 200 pulses per second. Conventional logic is used to drive the motor $M_2$ in either a clockwise or a counterclockwise direction in response to digital inputs to the stepping motor drive logic unit 62. This logic merely supplies a clockwise or a counterclockwise output for the control relay CR-1 in response to these digital inputs inconjunction with a pulse train input to be described in greater detail hereinbelow. The motor has a double ended shaft, and a manual crank permits manual adjustment of the tube height H.

Turning now to a more detailed description of the tubular support rod 50 which carries the cross arm 28 associated with the refractory tube 16, FIG. 2 shows the shaft 56 as having a threaded upper end portion 64 extending upwardly into the lower end of the support rod 50. Nut means is provided in the lower end of the tubular support rod 50, said nut means comprising a threaded member 66 threadably received on the upper threaded portions 64 of the shaft 56.

Resilient means is provided to connect the nut 66 to the rod 50 in order to allow rotation of the shaft 56 without necessarily achieving vertical motion of the cross arm 28 associated with the rod 50, as for example when the molten glass in the feeder bowl has hardened. To permit such motion prior to sufficient softening of the molten glass would cause damage to the revolving refractory tube 16. While the majority of glassware forming machine operators are sufficiently well trained so as not to start revolving of the tube until the tube has been raised above the curb in the feeder bowl, it is difficult for the operator to know when the molten glass is sufficiently soft so that he can raise the tube as a preliminary step to starting up his machine. Yieldable or resilient means is provided between the nut 66 and the tube 50 so as to preclude damage to the revolving tube in this situation.

Turning now to a more specific description of said resilient means connecting the rod to the nut, FIG. 2 shows the rod 50 as being slidably mounted for vertical movement in the bearings 44 and 46. This rod is tubular in shape and inside said rod 58 a tubular sleeve 68 is slidably received for limited motion relative to the outer support rod 50. The internally threaded nut 66 is pinned in the lower end of this internal tubular sleeve 68 as indicated generally at 70. A diametrically extending cross pin 72 associated with the upper end of the sleeve 68 is supported at its opposite end portions in the tubular support rod 50 and said pin extends through aligned slots 74, 74 defined in the upper side wall of the internal sleeve 68 so as to limit the vertical motion of the internal sleeve with respect to the support rod 50. A plunger 76 is provided in the upper end of the sleeve 68 and this plunger is fixedly attached to the support rod 50 by means of the cross pin 72. Thus, the support rod 50 is joined to the plunger 76 and is adapted to move with it. On the other hand, the internal sleeve 68 is adapted to move relative to these components as dictated by the longitudinal extent of the slots 74, 74. A coil compression spring 78 acts between the lower end of the plunger 76 and the upper end of the nut 66 to resiliently connect the nut 66 to the plunger 76 and hence to the rod 50. As mentioned above this resilient or yieldable connection between these members permits rotational movement of the threaded shaft 56 without necessarily achieving vertical motion of the cross arm and hence of the refractory plunger 16. Alternatively, the output torque of the stepping motor can be so selected that it is only sufficient to raise the refractory tube in the feeder bowl when the glass temperature has been raised to the point where the glass has softened.

Still with reference to FIG. 2, means is provided for relieving the gravitational load of the refractory tube, its drive motor, and the cross arm 28, on the threaded nut 66 and shaft 64 and thereby reduces the frictional wear between these elements and eliminate or at least minimumize the backlash between these elements. Such a result will permit the operator to achieve the necessary repeatability of the vertical height adjustment H associated with the feeding of molten glass at a predetermined and desired rate. Said means preferably comprises a tension spring 80 acting between the cross pin 72 and fixed structure defined by a tubular spring support housing 82 which extends upwardly above the C-shaped frame 42 and which includes a cover plate 84 with an associated adjusting nut 86 to permit varying the tension on the spring 80 through rotation of an adjust shaft 88.

Turning now to a more complete description of the control circuitry associated with the stepping motor $M_2$ and referring particularly to the schematic diagram of FIG. 3, increase and decrease gob weight push button switches are provided on the control panel depicted at 62 in FIG. 2, such gob weight change switches being shown schematically in FIG. 3 at 100 and 102 respectively. Basically, these switches are coupled to flip flops FF-3 and FF-4 respectively, which flip flops provide digital outputs corresponding to increase and decrease signals to the stepping motor drive unit 104 in order to control the direction of rotation of the stepping motor $M_2$. The stepping motor drive unit 104 also requires an input in line 106 before stepping motor $M_2$ can be driven, and it is also noted that relay CR-1 must also be energized before the stepping motor $M_2$ will operate.

Basically, the circuitry of FIG. 3 is intended to require that the operator not only press an increase or decrease gob weight push button, but that he also depress another button before being able to operate the stepping motor $M_2$. During normal operation of the apparatus, that is when only a minor change in molten glass flow of the feeder is desired, the increment advance push button 105 must be momentarily depressed, along with the appropriate gob weight change push button 100 or 102. Closing of the increment advance push button 105 will trigger the one shot multivibrator OS-1 providing an input signal to flip flop FF-2 through AND gate 1. The logic is designed to require a signal in line 108 and such signal will be characterized herein as a "gob weight change signal" since it will come from either flip flop FF-3 or FF-4 through OR gate 2. Triggering flip flop FF-2 will provide a signal in line 110 through OR gate 1 to the pulse generator 112.

Once the pulse generator 112 is energized in response to such a signal it will be apparent that a train of pulses from the pulse generator is available to the stepping motor drive unit 104 in line 106. However, it is also noted that this pulse train signal reaches AND gate 2 and that this AND gate 2 also receives a signal in line 114, that is "gob weight change signal" from OR gate 2. Finally, AND gate 2 also receives the necessary third signal in line 116 from the flip flop FF-2. Thus, the counter 118 will operate under these conditions, and depending upon the position of the rotary selector switch 120 the counter will produce an output or reset pulse signal in line 122 after a predetermined count is reached. This reset signal is fed via line 124 to flip flop FF-2 resetting flip flop FF-2 and thereby interrupting the signal in line 110 through OR gate 1 to the pulse generator 112. Once the pulse generator 112 stops, no signal is provided in the line 106 to the stepping motor drive unit 104 and stepping motor $M_2$ will stop rotating.

Turning now to a consideration of the operation for the manual override push button 126, flip flop FF-1 is coupled to the manual override push button 126 and generates an output through OR gate 1 thereby initiating operation of the pulse generator 112. However, and as mentioned above, unless an increase or decrease gob weight signal is provided in one or the other of the two inputs so labelled to the stepping motor drive 104, stepping motor $M_2$ will not operate. In order to prevent unlimited time operation of the stepping motor $M_2$ in the manual mode, that is by pressing manual override button 126 in conjunction with one or the other of the gob weight change push buttons 100 and 102, the control circuit of FIG. 3 also includes a shunt line 128 which shunt line will by-pass OR gate 2 initiating one shot multivibrator OS-2 and thereby energizing relay CR-1 for the time limit imposed by said one shot multivibrator. Upon the expiration of a predetermined time delay preferably on the order of one minute, relay CR-1 will be deenergized and stepping motor $M_2$ will be stopped through contacts associated with this relay CR-1. It will be apparent that this relay must also be energized in the normal mode of operation described in the preceding paragraph, and flip flop FF-2 is adapted to provide the necessary signal for normal operation of this relay through line 130. This limit feature assures that excessive heat build-up in the control unit will not occur.

The counter 118 includes a rotary selector switch 120 as mentioned above, and this counter includes units 118a and 118n which will permit presetting the counter to a desired pulse count permitting predetermined incremental changes in the rotational angular displacement of the stepping motor $M_2$ depending upon the position of the rotary selector switch 120. As mentioned above the stepping motor rotates at one revolution per second in response to a 200 pps pulse train. The divide by circuits associated with the counter will permit the incremental advance circuit to achieve either one complete revolution of the motor (equivalent to a height change, H of 0.0125 inches) or to provide for one-half a revolution per increment, or one and one-half revolutions per increment depending upon the position of the selector 120.

Reset push button 132 is coupled to a one shot multivibrator OS-3 so as to permit resetting of the timer associated with multivibrator OS-2 if for any reason the power is interrupted to the system and it is therefore necessary to initiate operation of the circuitry after such power interruption.

Push button 132 also acts to reset counter chain 118 to zero. This precludes a precount stored in the counter after a turn-on, thereby assuring that the first increment asked for is provided with a full count.

Upon starting up the feeder after the glass has become hardened, the operator need only depress the gob weight increase push button and the override button for about 10 seconds to provide for ultimate raising of the tube by approximately one-eighth inch when the glass becomes sufficiently soft to allow refractory tube movement.

We claim:

1. In a feeder apparatus for handling molten glass and including a feeder bowl with a lower outlet spout defined in part by an annular curb over which the molten glass is adapted to flow in response to vertical reciprocating motion of a plunger, and including a rotatable refractory tube arranged coaxially with the plunger and with its lower end spaced above the annular curb to a height H to define an annular passageway for the molten glass, the improvement comprising:
   a. support means for said rotatable tube, including a C-shaped frame member defining vertically spaced slide bearings, said C-shaped member having an upper end and a lower end,
   b. a tubular support rod slidably received in said spaced bearings,
   c. a cross arm carried by said rod and disposed between said upper end and said lower end of said C-shaped member, and including means adjacent one end for rotatably supporting the upper end of said tube, and a motor adjacent the opposite end and drivingly connected to said tube, said cross arm being supported by said rod so that the weight of said motor substantially balances that of the tube,
   d. a threaded shaft coaxially arranged in the lower end of said support rod and journalled in the C-shaped frame,
   e. nut means threadably received on said shaft and connected to said support rod for moving said rod vertically in response to rotation of said threaded shaft, and
   f. means for rotating said threaded shaft and varying the height, H.

2. The combination of claim 1 further characterized by resilient means connecting said rod to said nut means, said resilient means comprising:
   a. a tubular sleeve slidably received in said rod and having said nut means attached to its lower end,
   b. a support plunger slidably received in the upper end of said sleeve,
   c. a pin carried by said plunger and having at least one end portion projecting through a longitudinally extending slot in the side wall of said sleeve, which end portion is carried by said rod to join said plunger to said rod and to allow said sleeve to move vertically in said rod within limits defined by the longitudinal dimension of said slot,
   d. and a compression spring acting between said support plunger and said nut means to resiliently connect said rod to said nut means.

3. The combination of claim 2 further characterized by a tubular spring support housing extending upwardly above said C-shaped frame, and a tension spring in said housing, said tension spring acting between said pin and the upper end of said housing to counteract the weight of said refractory tube and said cross arm and thereby reduce the frictional force on said threaded shaft and nut means.

4. The combination of claim 1, wherein said means for rotating said threaded shaft comprises:
   a. an electric stepping motor operatively connected to said threaded shaft for rotating said threaded shaft, and
   b. a solid state control circuit for said stepping motor, including increase and decrease gob weight push button switches, said control circuit including an incremental advance circuit for stepping said motor to rotate it and said threaded shaft through an incremental angular displacement and in a direction dictated by which of said gob weight switches are depressed.

5. The combination of claim 4 further characterized in that said incremental advance circuit comprises:
   a. a push button incremental switch,
   b. a multivibrator coupled to said incremental switch, for producing a "one shot" pulse when said switch is closed,
   c. gate means for producing a gob weight change signal when one of said gob weight switches is closed and said one shot pulse both occur,
   d. a pulse generator energized in response to said gob weight change signal for producing a train of pulses until said gob weight change signal ceases,
   e. a counter energized by said gob weight change signal and adapted to count pulses from said pulse generator, said counter being preset to produce a reset pulse when a predetermined pulse count is reached,
   f. and means coupling said stepping motor to said pulse generator output and to said counter reset pulse whereby said motor starts in response to the former and stops in response to the latter.

6. The combination of claim 5 further characterized in that said gate means for producing said gob weight change signal comprises:
   a. two gob weight flip flops each of which is coupled to one of said gob weight push button switches,
   b. OR gate means for producing a gob weight change pulse when either of said gob weight switch associated flip flops are set,
   c. first AND gate means for producing an output pulse when both said "one shot" pulse and said weight change pulse occur, d. and said coupling means including a second flip flop coupled to said first AND gate means to generate said gob weight change signal to said pulse generator and to said counter, said second flip flop being reset by said counter reset pulse.

7. The combination of claim 6 further characterized by second AND gate means associated with said counter to require both said pulse generator pulse train and said gob weight change signal to energize said counter and thereby alter gob weight.

8. The combination of claim 7 further characterized by a push button override switch, a first flip flop coupled to said override switch, and a first OR gate for feeding the output of said first flip flop to said pulse generator as an alternative to said second flip flop output to provide a means for manually jogging said stepping motor to increase or decrease gob weight.

9. The combination of claim 8 further characterized by said second AND gate means associated with said counter further requiring said second flip flop output signal whereby one of said gob weight switches, and; either said increment switch, or said override switch must be closed to increase or decrease gob weight.

10. The combination of claim 5 further characterized in that said counter includes preset means to include a plurality of divide-by elements coupled to one another so that each such divide-by element can be selectively included in said counter to vary the pulse count required to generate said reset pulse.

11. The combination of claim 5 further characterized in that said means coupling said stepping motor to said pulse generator and to said counter includes a control flip flop which is set in response to said gob weight change signal and reset by said counter reset pulse, said coupling means further including a stepping motor control circuit which comprises a timing device for interrupting the power to said stepping motor whenever said motor is operated longer than the built-in time delay of said device to prevent overheating of the solid state control circuit elements in the environment of the molten glass feeder.

12. The combination of claim 4 further characterized by a manual crank on said stepping motor shaft to permit manual adjustment of said refractory tube height H.

* * * * *